United States Patent
Kitayama et al.

(10) Patent No.: US 12,552,893 B2
(45) Date of Patent: Feb. 17, 2026

(54) GRAFT COPOLYMER AND RESIN FILM

(71) Applicant: KANEKA CORPORATION, Osaka (JP)

(72) Inventors: Fuminobu Kitayama, Osaka (JP); Takuya Kamimura, Osaka (JP)

(73) Assignee: KANEKA CORPORATION, Osaka (JP)

(*) Notice: Subject to any disclaimer, the term of this patent is extended or adjusted under 35 U.S.C. 154(b) by 237 days.

(21) Appl. No.: 18/210,832

(22) Filed: Jun. 16, 2023

(65) Prior Publication Data

US 2023/0322994 A1 Oct. 12, 2023

Related U.S. Application Data

(63) Continuation-in-part of application No. PCT/JP2021/046730, filed on Dec. 17, 2021.

(30) Foreign Application Priority Data

Dec. 17, 2020 (JP) ................................ 2020-209480

(51) Int. Cl.
C08F 265/06 (2006.01)
C09D 151/00 (2006.01)

(52) U.S. Cl.
CPC ........ *C08F 265/06* (2013.01); *C09D 151/003* (2013.01)

(58) Field of Classification Search
CPC ............................ C08F 265/06; C09D 151/003
See application file for complete search history.

(56) References Cited

U.S. PATENT DOCUMENTS

| | | | |
|---|---|---|---|
| 3,914,341 A * | 10/1975 | Kliment | C08F 220/281 521/905 |
| 4,959,417 A * | 9/1990 | Miyazono | C08F 265/04 525/274 |
| 5,236,911 A * | 8/1993 | Koyama | C08L 33/10 525/85 |
| 6,218,447 B1 | 4/2001 | Sugaya et al. | |
| 6,323,259 B1 * | 11/2001 | Ikegami | C08F 285/00 523/201 |
| 2007/0110902 A1 * | 5/2007 | Johnson | C08F 265/04 427/372.2 |
| 2010/0168331 A1 * | 7/2010 | Terada | C08L 101/00 525/54.2 |
| 2013/0115185 A1 * | 5/2013 | Tamareselvy | A61Q 19/10 424/70.16 |
| 2013/0183361 A1 * | 7/2013 | Tamareselvy | A61Q 5/02 510/438 |
| 2017/0107369 A1 * | 4/2017 | Kitayama | C08F 265/06 |
| 2018/0028420 A1 * | 2/2018 | Li | C08F 265/06 |
| 2018/0179412 A1 * | 6/2018 | Bitler | C09D 151/003 |
| 2020/0385500 A1 | 12/2020 | Kitayama et al. | |

FOREIGN PATENT DOCUMENTS

| | | | |
|---|---|---|---|
| CN | 111788264 A | | 10/2020 |
| JP | 2004352837 A | * | 12/2004 |
| JP | 2007-176965 A | | 7/2007 |
| JP | 2020147653 A | * | 9/2020 |
| WO | 9955779 A1 | | 11/1999 |
| WO | 2017/022704 A1 | | 2/2017 |

OTHER PUBLICATIONS

JP 2020147653 A Machine Translation (Year: 2019).*
International Search Report issued in corresponding International Application No. PCT/JP2021/046730 mailed Feb. 8, 2022 (5 pages).
Written Opinion issued in corresponding International Application No. PCT/JP2021/046730 mailed Feb. 8, 2022 (5 pages).
Office Action issued in counterpart Chinese Patent Application No. 202180084884.1 mailed Jun. 24, 2025 (17 pages).

* cited by examiner

*Primary Examiner* — Travis M Figg
(74) *Attorney, Agent, or Firm* — Osha Bergman Watanabe & Burton LLP

(57) ABSTRACT

A graft copolymer contains crosslinked (meth)acrylic polymer particles (a) having an average particle size of 150 nm or less and a glass transition temperature of −10° C. or lower and a non-crosslinked methacrylic polymer component (b) having a weight-average molecular weight of $25\times10^4$ or more. At least a part of the non-crosslinked polymer component (b) is grafted to the crosslinked polymer particles (a). The crosslinked polymer particles (a) account for 1 to less than 50 wt % of the total weight of the crosslinked polymer particles (a) and the non-crosslinked polymer component (b).

20 Claims, No Drawings

GRAFT COPOLYMER AND RESIN FILM

TECHNICAL FIELD

One or more embodiments of the present invention relate to: a graft copolymer formable into a resin film; a resin composition for film production which contains the copolymer; a dope; and a resin film.

BACKGROUND

Methacrylic resins are beneficial polymers which are excellent in transparency, color quality, appearance, weathering resistance, gloss, and workability and which are therefore widely used in a variety of industrial fields. In particular, by virtue of the excellent transparency, appearance, and weathering resistance, films formed from methacrylic resins are used in various applications such as in interior and exterior materials for automobiles, exterior materials for electronic appliances including mobile phones and smartphones, and interior and exterior materials for civil engineering and building products including floors, windows, interior and exterior walls, daylighting parts, and road signs. Methacrylic resins have excellent optical properties, by virtue of which they have recently been used also in optical members such as those of liquid crystal display devices and organic EL display devices.

However, resin films formed from common methacrylic resins have the disadvantage of low impact resistance. A widely used technique for impact resistance improvement is to incorporate a graft copolymer containing a rubber component into a methacrylic resin.

A known example of such a rubber-containing graft copolymer is a core-shell graft copolymer having a core layer made of rubber and a shell layer that improves the compatibility with methacrylic resins (see Patent Literature 1, for example).

PATENT LITERATURE

PTL 1: WO 99/055779

Although the incorporation of such a conventional core-shell graft copolymer into a methacrylic resin can improve the strength of the methacrylic resin, the core-shell graft copolymer is prone to aggregation due to the rubber component contained in the copolymer and has low storage stability. In production of a resin film by solution casting, a dope prepared by dissolving the core-shell graft copolymer and a methacrylic resin in a solvent is likely to become turbid, especially over time, and the resin film made from the dope is inferior in haze.

SUMMARY

In view of the above circumstances, one or more embodiments of the present invention aims to provide: a graft copolymer having high heat resistance, formable into a film with high strength and low haze, and having high storage stability; and a resin film formed from the graft copolymer.

As a result of intensive studies, the present inventors have found that the above can be solved by a graft copolymer that contains a particular type of crosslinked (meth)acrylic polymer particles and a particular type of non-crosslinked methacrylic polymer component in particular proportions and in which the non-crosslinked methacrylic polymer component is grafted to the crosslinked (meth)acrylic polymer particles. Based on this finding, the inventors have arrived at one or more embodiments of the present invention.

Specifically, one or more embodiments of the present invention relate to a graft copolymer containing: crosslinked (meth)acrylic polymer particles (a) having an average particle size of 150 nm or less and a glass transition temperature of −10° C. or lower; and a non-crosslinked methacrylic polymer component (b) having a weight-average molecular weight of $25 \times 10^4$ or more, wherein at least part of the non-crosslinked methacrylic polymer component (b) is grafted to the crosslinked (meth)acrylic polymer particles (a), and the crosslinked (meth)acrylic polymer particles (a) account for 1 to less than 50 wt % of the total weight of the crosslinked (meth)acrylic polymer particles (a) and the non-crosslinked methacrylic polymer component (b).

The non-crosslinked methacrylic polymer component (b) may contain 70 to 99 wt % of methyl methacrylate units.

The non-crosslinked methacrylic polymer component (b) may further contain at least one type of monomer units selected from the group consisting of: N-substituted maleimide monomer units; methacrylic ester units having an ester moiety that is a primary or secondary hydrocarbon group having 2 to 20 carbon atoms or that is an aromatic hydrocarbon group; methacrylic ester units having an ester moiety that is a saturated hydrocarbon group having a fused ring structure and having 7 to 16 carbon atoms; methacrylic ester units having an ester moiety that is a linear or branched group containing an ether bond; and styrenic monomer units.

The non-crosslinked methacrylic polymer component (b) may further contain at least one type of monomer units selected from the group consisting of N-substituted maleimide monomer units and methacrylic ester units having an ester moiety that is a saturated hydrocarbon group having a fused ring structure and having 7 to 16 carbon atoms.

The non-crosslinked methacrylic polymer component (b) may have a glass transition temperature of 118° C. or higher.

Preferably, the crosslinked (meth)acrylic polymer particles (a) contain a monomer component other than a polyfunctional monomer, and the monomer component contains 90 to 100 wt % of an alkyl acrylate having an alkyl group having 1 to 8 carbon atoms.

The crosslinked (meth)acrylic polymer particles (a) may be formed from 100 parts by weight of a monomer component other than a polyfunctional monomer and 0.1 to 2.0 parts by weight of the polyfunctional monomer.

One or more embodiments of the present invention also relate to: a resin composition for use in film production by solution casting, the resin composition containing the graft copolymer; a dope containing the resin composition for use in film production and a solvent; a resin film production method including casting the dope onto a surface of a support and subsequently evaporating the solvent; or a resin film formed from the resin composition for use in film production by solution casting.

The resin film may have a thickness of 1 to 500 μm.

Preferably, the resin film is a protective film to be disposed on a surface of a base material.

The resin film may be an optical film.

The optical film may be a polarizer protective film.

One or more embodiments of the present invention further relate to: a polarizing plate including a polarizer and the resin film disposed on the polarizer; and a display device including the polarizing plate.

One or more embodiments of the present invention can provide: a graft copolymer having high heat resistance, formable into a film with high strength and low haze, and having high storage stability; and a resin film formed from the copolymer.

With the use of the graft copolymer according to one or more embodiments of the present invention, a resin film with high strength can be formed even when the resin component used is the copolymer alone. Additionally, there is no need to incorporate and disperse a core-shell graft copolymer in a methacrylic resin as in conventional cases, and this allows for easy formation of a resin film with low haze. Furthermore, despite containing a rubber component, the graft copolymer has high storage stability and is advantageous also in that a dope prepared by dissolving the graft copolymer in a solvent is not likely to become turbid. As such, the haze of a resin film produced by solution casting using the dope can be low.

DETAILED DESCRIPTION

Hereinafter, one or more embodiments of the present invention will be described. One or more embodiments of the present invention are not limited to the described one or more embodiments.

(Graft Copolymer)

A graft copolymer according to one or more embodiments contains crosslinked (meth)acrylic polymer particles (a) and a non-crosslinked methacrylic polymer component (b). The crosslinked (meth)acrylic polymer particles (a) are a rubber component and can thus contribute to improvement in strength. The presence of the non-crosslinked methacrylic polymer component (b) makes it possible to achieve high heat resistance. In comparison with a conventional system composed of a methacrylic resin incorporating a core-shell graft copolymer, the crosslinked (meth)acrylic polymer particles (a) may be considered to correspond to the rubber component of the cores of the core-shell graft copolymer, and the non-crosslinked methacrylic polymer component (b) may be considered to correspond to the methacrylic resin which is the matrix of the conventional system.

At least part of the non-crosslinked methacrylic polymer component (b) is grafted to the crosslinked (meth)acrylic polymer particles (a). The grafting can be accomplished by producing the graft copolymer by emulsion polymerization as described below. Because of this production method, the graft copolymer may contain the non-crosslinked methacrylic polymer component (b) that is not grafted to the crosslinked (meth)acrylic polymer particles (a).

The graft copolymer according to one or more embodiments can take a form where the crosslinked (meth)acrylic polymer particles (a) having a small particle size are dispersed in the non-crosslinked methacrylic polymer component (b) having a high molecular weight, and thus the crosslinked (meth)acrylic polymer particles (a) are resistant to aggregation in the graft copolymer. As such, the graft copolymer according to one or more embodiments exhibits high stability both when stored in the form of a powder and when stored as a solute dissolved in a solvent of a dope. The graft copolymer according to one or more embodiments further has the advantage of being easily soluble in a solvent since aggregation of the crosslinked (meth)acrylic polymer particles (a) is suppressed.

(Crosslinked (Meth)Acrylic Polymer Particles (a))

The crosslinked (meth)acrylic polymer particles (a) are (meth)acrylic rubber particles. Thanks to the inclusion of the crosslinked (meth)acrylic polymer particles (a), the graft copolymer according to one or more embodiments can achieve high strength when, for example, formed into a film.

The crosslinked (meth)acrylic polymer particles (a) have a relatively small particle size. Specifically, the average particle size of the crosslinked (meth)acrylic polymer particles (a) is 150 nm or less. Thanks to the use of the crosslinked (meth)acrylic polymer particles having such a small particle size, the graft copolymer according to one or more embodiments can achieve low haze when, for example, formed into a film. Additionally, the fact that the crosslinked (meth)acrylic polymer particles (a) are small-sized particles eliminates the need to adjust the refractive index of the crosslinked (meth)acrylic polymer particles (a) to that of the non-crosslinked methacrylic polymer component (b). As such, a monomer composition that allows the crosslinked (meth)acrylic polymer particles (a) to have a low glass transition temperature can be employed regardless of the refractive index, and this enables the graft copolymer to achieve high strength when, for example, formed into a film.

In terms of low haze, the average particle size may be 130 nm or less, 120 nm or less, 110 nm or less, or 100 nm or less. The lower limit of the average particle size is not limited to a particular value. In terms of film strength or ease of particle production, the average particle size may be 30 nm or more, 50 nm or more, or 60 nm or more. The average particle size is a volume mean diameter, which can be measured as described in Examples below. The average particle size can be controlled by adjusting the conditions for particle production (in particular, such as the type and amount of the emulsifier used and the stirring conditions in emulsion polymerization).

The crosslinked (meth)acrylic polymer particles (a) have a glass transition temperature of $-10°$ C. or lower. Thanks to the use of the crosslinked (meth)acrylic polymer particles having such a low glass transition temperature, the graft copolymer can achieve high strength when, for example, formed into a film. The glass transition temperature can be controlled by adjusting the types and proportions of monomers constituting the crosslinked (meth)acrylic polymer particles (a).

The glass transition temperature of the crosslinked (meth) acrylic polymer particles (a) may be $-20°$ C. or lower, $-30°$ C. or lower, $-40°$ C. or lower, or $-45°$ C. or lower. The lower limit of the glass transition temperature is not limited to a particular value. For example, the glass transition temperature may be $-130°$ C. or higher, $-110°$ C. or higher, $-100°$ C. or higher, $-80°$ C. or higher, or $-70°$ C. or higher. The glass transition temperature of the crosslinked (meth)acrylic polymer particles (a) is one calculated by the Fox equation using values presented in *Polymer Handbook* (J. Brandrup, Interscience, 1989). For example, the glass transition temperature of poly(n-butyl acrylate) is $-54°$ C.

The crosslinked (meth)acrylic polymer particles (a) are particles made of a crosslinked (meth)acrylic polymer formed by polymerization of a polyfunctional monomer and a monomer component including a (meth)acrylic monomer. The monomer component other than the polyfunctional monomer includes an acrylic monomer and/or a methacrylic monomer and may include at least an acrylic monomer.

The acrylic monomer contained in the crosslinked (meth) acrylic polymer particles (a) may be an alkyl acrylate having an alkyl group having 1 to 8 carbon atoms. Specific examples of the alkyl acrylate include ethyl acrylate, n-butyl acrylate, n-octyl acrylate, and 2-ethylhexyl acrylate. One such alkyl acrylate may be used alone, or two or more such alkyl acrylates may be used in combination. Among the alkyl acrylates as mentioned above, n-butyl acrylate is preferred.

The methacrylic monomer that may be optionally contained in the crosslinked (meth)acrylic polymer particles (a) may be an alkyl methacrylate having an alkyl group having 1 to 8 carbon atoms. Specific examples of the alkyl methacrylate include methyl methacrylate, ethyl methacrylate, n-butyl methacrylate, isobutyl methacrylate, t-butyl methacrylate, hexyl methacrylate, 2-ethylhexyl methacrylate, and octyl methacrylate. One such alkyl methacrylate may be used alone, or two or more such alkyl methacrylates may be used in combination. Among the alkyl methacrylates as mentioned above, an alkyl methacrylate having an alkyl group having 1 to 4 carbon atoms is preferred. Methyl methacrylate is particularly preferred.

For the crosslinked (meth)acrylic polymer particles (a), monomers other than the above-described alkyl acrylate and alkyl methacrylate may be used. Examples of the other monomers include an acrylic ester other than the alkyl acrylate, a methacrylic ester other than the alkyl methacrylate, an aromatic vinyl monomer, and another copolymerizable vinyl monomer. Examples of the acrylic ester other than the alkyl acrylate include phenyl acrylate, benzyl acrylate, cyclohexyl acrylate, and isobornyl acrylate. Examples of the methacrylic ester other than the alkyl methacrylate include phenyl methacrylate, benzyl methacrylate, cyclohexyl methacrylate, and isobornyl methacrylate. Examples of the aromatic vinyl monomer include styrene, α-methylstyrene, chlorostyrene, and other styrene derivatives. Examples of the other copolymerizable vinyl monomer include: unsaturated nitrile monomers such as acrylonitrile and methacrylonitrile; α,β-unsaturated carboxylic acids such as acrylic acid, methacrylic acid, and crotonic acid; vinyl acetate; olefin monomers such as ethylene and propylene; vinyl halide monomers such as vinyl chloride, vinylidene chloride, and vinylidene fluoride; and maleimide monomers such as N-ethylmaleimide, N-propylmaleimide, N-cyclohexylmaleimide, N-phenylmaleimide, and N-o-chlorophenylmaleimide. One of the monomers as mentioned above may be used alone, or two or more thereof may be used in combination.

In terms of strength and heat resistance, it is preferable that in the monomer components constituting the crosslinked (meth)acrylic polymer particles (a), the monomer component other than a polyfunctional monomer should include 70 to 100 wt %, more preferably 80 to 100 wt %, even more preferably 90 to 100 wt %, particularly preferably 95 to 100 wt %, of an acrylic ester (in particular, an alkyl acrylate having an alkyl group having 1 to 8 carbon atoms).

The crosslinked (meth)acrylic polymer particles (a) are formed by polymerizing the monomer component in the presence of a polyfunctional monomer. Such a polyfunctional monomer is also known as a crosslinking agent or a crosslinkable monomer and is a compound having two or more unsaturated bonds copolymerizable with (meth)acrylic monomers per molecule. Specific examples of the polyfunctional monomer include allyl methacrylate, allyl acrylate, diallyl maleate, diallyl fumarate, diallyl itaconate, monoallyl maleate, monoallyl fumarate, butadiene, divinylbenzene, triallyl isocyanurate, alkylene glycol dimethacrylate, and alkylene glycol diacrylate. One of these may be used alone, or two or more thereof may be used in combination. Allyl methacrylate is preferred.

The amount of the polyfunctional monomer used may be set as appropriate in view of strength. Specifically, the amount of the polyfunctional monomer may be from about 0.1 to about 5.0 parts by weight per 100 parts by weight of the monomer component of the crosslinked (meth)acrylic polymer particles (a) (the monomer component other than the polyfunctional monomer). In terms of the strength of the graft copolymer, the amount of the polyfunctional monomer used may be from 0.2 to 3.5 parts by weight, from 0.2 to 3.0 parts by weight, from 0.3 to 2.0 parts by weight, or from 0.4 to 1.5 parts by weight.

(Non-Crosslinked Methacrylic Polymer Component (b))

The non-crosslinked methacrylic polymer component (b) is a polymer formed by polymerization of mainly a methacrylic monomer and having no crosslinked structure (i.e., a polymer obtained by polymerization without the use of any polyfunctional monomer). At least part of the non-crosslinked methacrylic polymer component (b) is grafted to the crosslinked (meth)acrylic polymer particles (a), and this makes the crosslinked (meth)acrylic polymer particles (a) resistant to aggregation. Thus, the graft copolymer according to one or more embodiments has high storage stability and can achieve low haze when formed into a film.

The non-crosslinked methacrylic polymer component (b) is a high-molecular-weight polymer and specifically has a weight-average molecular weight of $25 \times 10^4$ or more. By virtue of the non-crosslinked methacrylic polymer component (b) having a high molecular weight, the graft copolymer according to one or more embodiments can achieve high heat resistance and can be formed into a film by solution casting. In terms of making easier the film formation by solution casting, the weight-average molecular weight may be $30 \times 10^4$ or more, $35 \times 10^4$ or more, $40 \times 10^4$ or more, or $45 \times 10^4$ or more. The upper limit of the weight-average molecular weight is not limited to a particularly value. In terms of making easier the film formation by solution casting, the weight-average molecular weight may be $100 \times 10^4$ or less or $90 \times 10^4$ or less. The weight-average molecular weight of the non-crosslinked methacrylic polymer component (b) can be measured as described in Examples below.

In terms of the heat resistance of the graft copolymer, the non-crosslinked methacrylic polymer component (b) may have a glass transition temperature of 115° C. or higher, 118° C. or higher, or 120° C. or higher. The upper limit of the glass transition temperature is not limited to a particular value. For example, the glass transition temperature may be 160° C. or lower or may be 150° C. or lower. The glass transition temperature can be controlled by adjusting the types and proportions of monomers constituting the non-crosslinked methacrylic polymer component (b). The glass transition temperature of the non-crosslinked methacrylic polymer component (b) can be measured as described in Examples below. Alternatively, the glass transition temperature may be calculated by the Fox equation using values presented in *Polymer Handbook* (J. Brandrup, Interscience, 1989). For example, the glass transition temperature of poly(methyl methacrylate) is 105° C.

The non-crosslinked methacrylic polymer component (b) is a polymer composed mainly of methacrylic monomer units. In terms of the heat resistance and film formation of the graft copolymer, methyl methacrylate units are preferred as the methacrylic monomer units. In particular, the non-crosslinked methacrylic polymer component (b) may contain 70 to 99 wt % of methyl methacrylate units in the monomer components constituting the non-crosslinked methacrylic polymer component (b). In this case, the heat resistance can be improved, and the film formation by solution casting can more easily be achieved. The content of methyl methacrylate units may be from 75 to 98 wt %, from 80 to 97 wt %, from 85 to 96 wt %, from 88 to 95 wt %, or from 90 to 95 wt %.

The non-crosslinked methacrylic polymer component (b) may contain at least one type of monomer units other than methyl methacrylate units, the at least one type of monomer units being selected from the group consisting of: N-substituted maleimide monomer units; methacrylic ester units having an ester moiety that is a primary or secondary hydrocarbon group having 2 to 20 carbon atoms or that is an aromatic hydrocarbon group; methacrylic ester units having an ester moiety that is a saturated hydrocarbon group having a fused ring structure and having 7 to 16 carbon atoms; methacrylic ester units having an ester moiety that is a linear or branched group containing an ether bond; and styrenic monomer units. When the component (b) contains such monomer units, the rate of evaporation of a solvent from a cast layer in film production by solution casting can be increased without significant reduction in the heat resistance of the graft copolymer. The monomer units as described above may also be referred to as "drying-accelerating comonomer units" hereinafter.

Examples of the N-substituted maleimide monomer include N-phenylmaleimide, N-benzylmaleimide, N-cyclohexylmaleimide, and N-methylmaleimide. Among monomer units derived from these monomers, maleimide monomer units having a cyclic substituent on the N atom are preferred. That is, N-phenylmaleimide, N-benzylmaleimide, and N-cyclohexylmaleimide are preferred.

Examples of the methacrylic ester having an ester moiety that is a primary or secondary hydrocarbon group having 2 to 20 carbon atoms or that is an aromatic hydrocarbon group include ethyl methacrylate, propyl methacrylate, n-butyl methacrylate, hexyl methacrylate, cyclohexyl methacrylate, 2-ethylhexyl methacrylate, octyl methacrylate, stearyl methacrylate, phenyl methacrylate, and benzyl methacrylate. Among these, ethyl methacrylate, n-butyl methacrylate, cyclohexyl methacrylate, 2-ethylhexyl methacrylate, and benzyl methacrylate are preferred.

Examples of the methacrylic ester having an ester moiety that is a saturated hydrocarbon group having a fused ring structure and having 7 to 16 carbon atoms include dicyclopentanyl methacrylate and isobornyl methacrylate. The number of carbon atoms in the saturated hydrocarbon group may be from 8 to 14 or from 9 to 12. The fused ring structure is not limited to a particular type, but may be a structure composed of two five-membered rings fused at three adjacent carbon atoms.

Examples of the methacrylic ester having an ester moiety that is a linear or branched group containing an ether bond include 2-methoxyethyl methacrylate.

Examples of the styrenic monomer include styrene, α-methylstyrene, monochlorostyrene, and dichlorostyrene. Among these, styrene is preferred.

In order to increase the rate of evaporation of a solvent from a cast layer in solution casting and at the same time further enhance the heat resistance of the graft copolymer, the drying-accelerating comonomer units may include at least one type of monomer units selected from the group consisting of N-substituted maleimide monomer units and methacrylic ester units having an ester moiety that is a saturated hydrocarbon group having a fused ring structure and having 7 to 16 carbon atoms.

In this case, at least one type of monomer units selected from the group consisting of N-substituted maleimide monomer units and methacrylic ester units having an ester moiety that is a saturated hydrocarbon group having a fused ring structure and having 7 to 16 carbon atoms may be used alone as the drying-accelerating comonomer units. Alternatively, at least one type of monomer units selected from the group consisting of N-substituted maleimide monomer units and methacrylic ester units having an ester moiety that is a saturated hydrocarbon group having a fused ring structure and having 7 to 16 carbon atoms may be used in combination with other drying-accelerating comonomer units. The combined use makes it possible to control the heat resistance of the graft copolymer and the evaporation rate of the solvent and increase both the heat resistance and the evaporation rate in a balanced manner.

The drying-accelerating comonomer units other than N-substituted maleimide monomer units and methacrylic ester units having an ester moiety that is a saturated hydrocarbon group having a fused ring structure and having 7 to 16 carbon atoms may be at least one type of monomer units selected from the group consisting of the above-described methacrylic ester units having an ester moiety that is a primary or secondary hydrocarbon group having 2 to 20 carbon atoms or that is an aromatic hydrocarbon group, the above-described methacrylic ester units having an ester moiety that is a linear or branched group containing an ether bond, and the above-described styrenic monomer units.

The proportion of the drying-accelerating comonomer units in the monomer components constituting the non-crosslinked methacrylic polymer component (b) may be from 1 to 30 wt %, from 2 to 25 wt %, from 3 to 20 wt %, from 4 to 18 wt %, from 4 to 15 wt %, from 4 to 12 wt %, or from 5 to 10 wt %. In the case where the component (b) contains two or more types of drying-accelerating comonomer units, the "proportion of the drying-accelerating comonomer units" refers to the total proportion of all the contained drying-accelerating comonomer units in the total monomer units of the component (b). When the proportion by weight of the drying-accelerating comonomer units is in the range as mentioned above, the graft copolymer has high heat resistance, and at the same time the solvent evaporation rate in solution casting can be increased. The proportions by weight of the different monomer units can be determined by proton nuclear magnetic resonance spectroscopy.

The non-crosslinked methacrylic polymer component (b) may be a copolymer that does not contain any additional comonomer units that are not classifiable as drying-accelerating comonomer units or may be a copolymer that contains additional comonomer units that are not classifiable as drying-accelerating comonomer units. Examples of the additional comonomer include: methacrylic esters such as glycidyl methacrylate, epoxycyclohexylmethyl methacrylate, dimethylaminoethyl methacrylate, 2-hydroxyethyl methacrylate, 2-hydroxypropyl methacrylate, 2,2,2-trifluoroethyl methacrylate, 2,2,2-trichloroethyl methacrylate, methacrylamide, and N-methylolmethacrylamide; acrylic esters such as methyl acrylate, ethyl acrylate, propyl acrylate, butyl acrylate, 2-ethylhexyl acrylate, benzyl acrylate, octyl acrylate, glycidyl acrylate, epoxycyclohexylmethyl acrylate, 2-hydroxyethyl acrylate, 2-hydroxypropyl acrylate, acrylamide, and N-methylolacrylamide; carboxylic acids such as methacrylic acid and acrylic acid and their salts; vinyl cyanides such as acrylonitrile and methacrylonitrile; maleic acid, fumaric acid, and their esters; vinyl halides such as vinyl chloride, vinyl bromide, and chloroprene; vinyl esters such as vinyl formate, vinyl acetate, and vinyl propionate; and alkenes such as ethylene, propylene, butylene, butadiene, and isobutylene. The proportion of the additional comonomer units in the monomer components constituting the non-crosslinked methacrylic polymer component (b) may be 10 wt % or less, 8 wt % or less, or 5 wt % or less.

In the graft copolymer according to one or more embodiments, the proportion of the crosslinked (meth)acrylic polymer particles (a) in the total weight of the crosslinked (meth)acrylic polymer particles (a) and the non-crosslinked methacrylic polymer component (b) is from 1 to less than 50 wt %, and the proportion of the non-crosslinked methacrylic polymer component (b) is from more than 50 to 99 wt %. Since the graft copolymer according to one or more embodiments contains such a high proportion of the non-crosslinked methacrylic polymer component (b), the crosslinked (meth)acrylic polymer particles (a) are resistant to aggregation, and the graft copolymer is formable into a film with high strength and low haze. Additionally, the graft copolymer or a dope containing the graft copolymer can have high storage stability. The proportion of the crosslinked (meth)acrylic polymer particles (a) may be from 3 to 45 wt %, from 4 to 40 wt %, from 5 to 35 wt %, or from 6 to 30 wt %.

In terms of the folding resistance of the resulting film, the proportion of the crosslinked (meth)acrylic polymer particles (a) in the total weight of the crosslinked (meth)acrylic polymer particles (a) and the non-crosslinked methacrylic polymer component (b) may be 5 wt % or more, 6 wt % or more, or 7 wt % or more. In terms of the moisture permeability and elastic modulus of the film, the proportion of the crosslinked (meth)acrylic polymer particles (a) may be at most 25 wt %, 20 wt % or less, 15 wt % or less, 12 wt % or less, or 10 wt % or less. In terms of the balance of moisture permeability, elastic modulus, and folding resistance, the proportion of the crosslinked (meth)acrylic polymer particles (a) may be 6 wt % or more or 7 wt % or more and may be 20 wt % or less, 15 wt % or less, 12 wt % or less, or 10 wt % or less.

(Method for Producing Graft Copolymer)

The graft copolymer according to one or more embodiments can be produced by a common emulsion polymerization process using an emulsifier and a polymerization initiator. Specifically, the crosslinked (meth)acrylic polymer particles (a) are formed by emulsion polymerization, and then monomer components constituting the non-crosslinked methacrylic polymer component (b) are added to the polymerization system to further carry out emulsion polymerization and thus form the non-crosslinked methacrylic polymer component (b). In this manner, the graft copolymer can be produced in which at least part of the non-crosslinked methacrylic polymer component (b) is grafted to the crosslinked (meth)acrylic polymer particles (a). The graft copolymer produced by the above method can take a form where the crosslinked (meth)acrylic polymer particles (a) are dispersed well in the non-crosslinked methacrylic polymer component (b).

Examples of the emulsifier include, but are not limited to: anionic surfactants such as sodium alkyl sulfonates, sodium alkylbenzene sulfonates, dioctyl sodium sulfosuccinate (di(2-ethylhexyl) sodium sulfosuccinate), sodium lauryl sulfate, fatty acid sodium salts, and phosphate salts such as sodium polyoxyethylene lauryl ether phosphate; and non-ionic surfactants. One of these surfactants may be used alone, or two or more thereof may be used in combination. In terms of improving the thermal stability of a film formed from the graft copolymer, it is preferable to perform polymerization using dioctyl sodium sulfosuccinate (di(2-ethylhexyl) sodium sulfosuccinate) or a phosphate salt (a salt of an alkali metal or alkaline-earth metal) such as sodium polyoxyethylene lauryl ether phosphate, and it is particularly preferable to perform polymerization using a phosphate salt (a salt of an alkali metal or alkaline-earth metal) such as sodium polyoxyethylene lauryl ether phosphate.

The polymerization initiator is not limited to a particular type. In terms of improving the thermal stability of the film, the polymerization initiator may be one whose 10-hour half-life temperature is 100° C. or lower. Such a polymerization initiator may be, but not limited to, a persulfate salt. Specific examples of the persulfate salt include potassium persulfate, sodium persulfate, and ammonium persulfate.

The polymerization initiator may be added at least at the time of formation of the crosslinked (meth)acrylic polymer particles (a) and may be further added at the time of formation of the non-crosslinked methacrylic polymer component (b).

In the formation of the non-crosslinked methacrylic polymer component (b), polymerization may be performed in the presence of a chain transfer agent in order to control the molecular weight of the polymer component (b). Examples of chain transfer agents that can be used in the polymerization include, but are not limited to: primary alkyl mercaptan chain transfer agents such as n-butyl mercaptan, n-octyl mercaptan, n-hexadecyl mercaptan, n-dodecyl mercaptan, and n-tetradecyl mercaptan; secondary alkyl mercaptan chain transfer agents such as s-butyl mercaptan and s-dodecyl mercaptan; tertiary alkyl mercaptan chain transfer agents such as t-dodecyl mercaptan and t-tetradecyl mercaptan; thioglycolic esters such as 2-ethylhexyl thioglycolate, ethylene glycol dithioglycolate, trimethylolpropane tris (thioglycolate), and pentaerythritol tetrakis(thioglycolate); thiophenol; tetraethylthiuram disulfide; pentaphenylethane; acrolein; methacrolein; allyl alcohol; carbon tetrachloride; ethylene bromide; styrene oligomers such as α-methylstyrene dimer; and terpinolene. One of these may be used alone, or two or more thereof may be used in combination.

A graft copolymer latex obtained by the emulsion polymerization described above may be dried by heating or spray-dried to obtain the graft copolymer in the form of a solid mass or powder. Alternatively, the graft copolymer in the form of a solid mass or powder may be obtained by processing the graft copolymer latex by a known method such as one in which the graft copolymer latex is coagulated by adding a water-soluble electrolyte such as a salt or an acid, the coagulated latex is heat-treated, and then the resin component is separated from the aqueous phase and dried. Preferred among the methods as mentioned above is that which includes coagulation by means of a salt. The salt may be, but not limited to, a divalent salt, and specific examples of the salt include calcium salts such as calcium chloride and calcium acetate and magnesium salts such as magnesium chloride and magnesium sulfate. Among these, magnesium salts such as magnesium chloride and magnesium sulfate are preferred. At the time of coagulation, a commonly-used additive such as an antioxidant or ultraviolet absorber may be added.

Before the coagulation process, it is preferable to filter the latex by means such as a filter or a mesh to remove fine polymer scales. This filtration can reduce the presence of fisheyes or foreign substances attributed to fine polymer scales or can also reduce the amount of coarse particles in a dope.

(Resin Composition)

The graft copolymer according to one or more embodiments can be used to make a resin composition for use in film production by solution casting. The resin composition may contain only the graft copolymer according to one or more embodiments as a resin component or may contain another resin in addition to the graft copolymer according to one or more embodiments. Examples of the other resin include, but are not limited to: methacrylic resins; styrene resins such as an acrylonitrile-styrene resin and a styrene-maleic anhydride resin; polycarbonate resins; polyvinyl acetal resins; cellulose acylate resins; fluororesins such as polyvinylidene fluoride and a polyfluoroalkyl (meth)acrylate resin; silicone resins; polyolefin resins; polyethylene terephthalate resins; polybutylene terephthalate resins; and polyimide resins.

The content of the other resin is not limited to a particular range, and may be, for example, from about 0 to about 50 parts by weight per 100 parts by weight of the graft copolymer according to one or more embodiments. The content of the other resin may be from 0 to 30 parts by weight, from 0 to 10 parts by weight, from 0 to 5 parts by weight, or from 0 to 1 parts by weight.

The resin composition for use in film production may further contain known additives such as a light stabilizer, an ultraviolet absorber, a thermal stabilizer, a matting agent, a light diffusing agent, a colorant, a dye, a pigment, an antistatic agent, a heat reflecting agent, a lubricant, a plasticizer, an ultraviolet absorber, a stabilizer, and a filler. The resin composition may further contain a conventionally-known core-shell graft copolymer.

(Dope)

The resin composition for use in film production can be dissolved or dispersed in a solvent to make a dope used to produce a resin film by solution casting.

The solvent is one in which the resin composition for use in film production is soluble or dispersible, and is not limited to a particular type. The solvent may include a solvent (c-1) for which a hydrogen bonding term $\delta H$ of Hansen solubility parameters is from 1 to 12. With the use of such a solvent for making a dope, the graft copolymer according to one or more embodiments can be dissolved or dispersed well in the solvent. A solvent for which the hydrogen bonding term $\delta H$ is from 3 to 10 is preferred, and a solvent for which the hydrogen bonding term $\delta H$ is from 5 to 8 is more preferred.

Solubility parameters (SP values) have been conventionally known as indicators of the solubility of materials, and Hansen solubility parameters have been proposed as such SP values. The Hansen solubility parameters consist of cohesive energy terms classified according to the type of interaction energy between molecules (London dispersion force, dipole-dipole interaction force, and hydrogen bonding force), and the cohesive energy terms are expressed as a London dispersion force term, a dipole-dipole interaction force term, and a hydrogen bonding force term, respectively. The hydrogen bonding term $\delta H$ of the Hansen solubility parameters is used as an indicator of the solubility of the graft copolymer in the solvent. The details of the hydrogen bonding term $\delta H$ are described, for example, in "Feature Article: Design for Polymer Compatibilization 1. Solubility Evaluation by Hansen Solubility Parameters (HSP values)", Hideki YAMAMOTO, *Adhesion Technology*, Japan, Vol. 34, No. 3, 2014 (116th issue), pp. 1-8.

Examples of the solvent (c-1) for which the hydrogen bonding term $\delta H$ is from 1 to 12 include 1,4-dioxane (9.0), 2-phenylethanol (11.2), acetone (7.0), acetonitrile (6.1), chloroform (5.7), dibasic ester (8.4), diacetone alcohol (10.8), NN-dimethylformamide (11.3), dimethyl sulfoxide (10.2), ethyl acetate (7.2), γ-butyrolactone (7.4), methyl ethyl ketone (5.1), methyl isobutyl ketone (4.1), methylene chloride (7.1), n-butyl acetate (6.3), N-methyl-2-pyrrolidone (7.2), propylene carbonate (4.1), 1,1,2,2-tetrachloroethane (5.3), tetrahydrofuran (8.0), and toluene (2.0). The parenthesized numerals designate the values of the hydrogen bonding term $\delta H$. One of these solvents may be used alone, or two or more thereof may be used as a mixture.

Among the above solvents, methyl ethyl ketone, chloroform, and methylene chloride are preferred because they have a high ability to dissolve the graft copolymer according to one or more embodiments and can be evaporated at a high rate. Methylene chloride is more preferred.

The solvent contained in the dope may consist only of the solvent (c-1) for which the hydrogen bonding term $\delta H$ is from 1 to 12. However, in view of improving film formability, film releasability, and ease of handling in solution casting, the solvent may include the solvent (c-1) for which the hydrogen bonding term $\delta H$ is from 1 to 12 and a solvent (c-2) for which the hydrogen bonding term $\delta H$ is from 14 to 24.

Examples of the solvent (c-2) for which the hydrogen bonding term $\delta H$ is from 14 to 24 include methanol (22.3), ethanol (19.4), isopropanol (16.4), butanol (15.8), and ethylene glycol monoethyl ether (14.3). One of these solvents may be used alone, or two or more thereof may be used as a mixture.

In the case where the solvent (c-1) for which the hydrogen bonding term $\delta H$ is from 1 to 12 is used in combination with the solvent (c-2) for which the hydrogen bonding term $\delta H$ is from 14 to 24, the amount of the solvent (c-1) may be from 55 to 95 wt %, from 60 to 90 wt %, from 65 to 85 wt %, or from 70 to 85 wt % based on the total weight of the solvents contained in the dope.

The proportion of the graft copolymer in the dope is not limited to a particular range and may be chosen as appropriate in view of factors such as the solubility or dispersibility of the graft copolymer in the solvent used and the conditions for solution casting. The proportion of the graft copolymer in the dope may be from 5 to 50 wt %, from 10 to 45 wt %, or from 15 to 40 wt %.

(Solution Casting)

The dope is used to produce a resin film by solution casting. Specifically, a resin film can be produced by casting the dope onto the surface of a support and subsequently evaporating the solvent.

The following describes one or more embodiments of the solution casting. The solution casting is not limited to that as described below. First, pellets containing the graft copolymer according to one or more embodiments and optionally other components are made, and then the pellets are mixed with a solvent to prepare a dope containing the components dissolved or dispersed in the solvent. Alternatively, instead of making pellets, the graft copolymer according to one or more embodiments and other components may be mixed simultaneously or sequentially with a solvent to prepare a dope containing the components dissolved or dispersed in the solvent. The dissolving or dispersing step can be carried out at a temperature and pressure controlled as appropriate. After the dissolving or dispersing step, the resulting dope may be filtered or degassed.

Subsequently, the dope is fed to a pressure die by means of a feed pump and cast through the slit of the pressure die onto the surface (mirrored surface) of a support such as an endless belt or a drum made of metal or synthetic resin, and thus a dope layer is formed on the surface of the support.

The dope layer formed is heated on the support to evaporate the solvent and thus form a film. The conditions for the solvent evaporation can be chosen as appropriate depending on the boiling point of the solvent used.

The film thus obtained is peeled from the surface of the support. Where appropriate, the obtained film may subsequently be subjected to other steps such as a drying step, a heating step, and a stretching step.

(Resin Film)

A resin film according to one or more embodiments is made of the above-described resin composition for use in film production and can be formed by solution casting using the dope as described above. The thickness of the resin film is not limited to a particular range, but may be 500 μm or less, 300 μm or less, or 200 μm or less. The thickness of the resin film may be 1 μm or more, 5 μm or more, 10 μm or more, or 30 μm or more.

The total light transmittance of the resin film according to one or more embodiments, as measured when the thickness of the resin film is 80 μm, may be 85% or more, 88% or more, or 90% or more. When the total light transmittance is within the above range, the resin film is suitable for use in applications requiring light permeability, such as in optical members, decorative applications, interior applications, and vacuum molding applications.

In terms of heat resistance, the glass transition temperature of the resin film according to one or more embodiments may be 100° C. or higher, 105° C. or higher, 110° C. or higher, 115° C. or higher, 120° C. or higher, 124° C. or higher, or 125° C. or higher.

The haze of the resin film according to one or more embodiments, as measured when the thickness of the resin film is 50 μm, may be 0.8% or less, 0.6% or less, 0.5% or less, 0.4% or less, or 0.3% or less. The internal haze of the resin film, as measured when the thickness of the resin film is 50 μm, may be 0.5% or less, 0.4% or less, 0.3% or less, or 0.2% or less. When the haze and the internal haze are within the above ranges, the resin film is suitable for use in applications requiring light permeability, such as in optical members, decorative applications, interior applications, and vacuum molding applications. The haze includes a haze at the inside of the film and a haze at the surface (outside) of the film, and the two types of hazes are referred to as "internal haze" and "external haze", respectively.

The resin film according to one or more embodiments can be used as an optical film. The optical anisotropy of the resin film may be small, especially when the resin film is used as a polarizer protective film. In particular, it is preferable that not only the optical anisotropy in the in-plane directions (length direction and width direction) of the film but also the optical anisotropy in the thickness direction of the film be small That is, it is preferable that the absolute values of both the in-plane retardation and the out-of-plane retardation be small. More specifically, the absolute value of the in-plane retardation may be 30 nm or less, 20 nm or less, 15 nm or less, 13 nm or less, 12 nm or less, or 10 nm or less. The absolute value of the out-of-plane retardation may be 50 nm or less, 20 nm or less, 15 nm or less, 10 nm or less, 8 nm or less, or 5 nm or less. The resin film with small retardations is suitable for use as a polarizer protective film of a polarizing plate of a liquid crystal display device.

The retardations are parameters calculated based on birefringence. The in-plane retardation (Re) and the out-of-plane retardation (Rth) can be calculated by the equations given below, respectively. For a film with perfect optical isotropy in three-dimensional directions, both the in-plane retardation (Re) and the out-of-plane retardation (Rth) are zero.

$$Re=(nx-ny)\times d$$

$$Rth=((nx+ny)/2-nz)\times d$$

In the equations, nx denotes a refractive index in an X-axis direction that is an in-plane direction in which the film extends (the direction of polymer chain orientation), ny denotes a refractive index in a Y-axis direction perpendicular to the X-axis direction, and nz denotes a refractive index in a Z-axis direction that is the thickness direction of the film. The letter d denotes the thickness of the film, and nx−ny denotes the orientation birefringence. The MD direction of the film is the X-axis direction. In the case where the film is a stretched film, the stretching direction is the X-axis direction.

(Stretching)

The resin film according to one or more embodiments has high toughness and high flexibility and may be an unstretched film or a stretched film. The stretching can improve the mechanical strength and thickness accuracy of the resin film.

In the case where the resin film according to one or more embodiments is produced as a stretched film, an unstretched film is first produced and then uniaxially or biaxially stretched. Alternatively, in the film forming process, stretching operation may be performed as appropriate during the progress of film formation and solvent evaporation. In either way, a stretched film (uniaxially-stretched film or biaxially-stretched film) can be produced. The stretching during the film forming process and the stretching after the film forming process may be combined as appropriate.

The stretching factor for the stretched film is not limited to a particular range, and may be chosen depending on the properties such as mechanical strength, surface texture, and thickness accuracy of the stretched film to be produced. In general, the stretching factor may be selected in the range of 1.1 to 5 times, in the range of 1.3 to 4 times, and or in the range of 1.5 to 3 times, although the preferred stretching factor depends on the stretching temperature. When the stretching factor is within the above range, the mechanical properties such as elongation, tear propagation strength, and crease-flex resistance of the film can be considerably improved.

(Applications)

If necessary, the gloss of the surface of the resin film according to one or more embodiments can be reduced by a known method. An example of the method is to add an inorganic filler or crosslinkable polymer particles. The film as obtained may be subjected to embossing to form a surface-textured layer having a prismatic texture, a pattern, a design, or a knurled texture or reduce the gloss of the surface of the film.

If necessary, another film may be disposed on the resin film according to one or more embodiments by dry lamination and/or thermal lamination using a pressure-sensitive adhesive or an adhesive. If necessary, a functional layer such as a hard coat layer, an antireflective layer, an antifouling layer, an antistatic layer, a printed decorative layer, a metallic luster layer, a surface-textured layer, or a matte layer may be formed on the front or back side of the resin film according to one or more embodiments.

The resin film according to one or more embodiments can be used in various applications exploiting its properties such as high heat resistance, transparency, and flexibility. For example, the resin film can be used in interior and exterior materials for automobiles, interior and exterior materials for personal computers, interior and exterior materials for mobile phones, interior and exterior materials for solar cells, and back sheets for solar cells. The resin film can be used also in the following products: products in the imaging industry, such as imaging lenses, viewfinders, filters, prisms, Fresnel lenses, and lens covers for cameras, VTRs, and projectors; products in the lens industry, such as optical disc pick-up lenses of CD players, DVD players, and MD players; products in the optical recording industry, such as optical discs such as CDs, DVDs, and MDs; products in the information equipment industry, such as films for organic EL displays, films for liquid crystal displays (e.g., light guide plates, diffuser plates, back sheets, reflective sheets, polarizer protective films, polarizing film transparent resin sheets, retardation films, light-diffusing films, and prism sheets for liquid crystal displays), and surface protective films; products in the optical communication industry, such as optical fibers, optical switches, and optical connectors; products in the vehicle industry, such as headlights, tail lamp lenses, inner lenses, instrument covers, and sunroofs of automobiles; products in the medical equipment industry, such as eyeglasses, contact lenses, lenses for endoscopes, and medical products requiring sterilization; products in the building and construction industry, such as road signs, bathroom furnishings, floorings, transparent panels for roads, lenses for double-glazed glass, daylighting windows, carports, lenses for lighting devices, lighting covers, and siding for buildings; and various other products such as microwavable containers (dishes), housings of household electrical appliances, toys, sunglasses, and stationery products. Additionally, the resin film can be used as a substitute for a transfer foil used for formation of a molded article.

The resin film according to one or more embodiments may be disposed on a base material made of metal or plastic. Examples of the method for disposing the resin film on a base material include: laminate molding; wet lamination in which an adhesive is applied to a metal plate such as a steel plate, then the film is placed on the metal plate, and the adhesive is dried to bond the film and plate together; and other lamination methods such as dry lamination, extrusion lamination, and hot-melt lamination.

Examples of the method for disposing the film on a plastic member include: insert molding or laminate injection press molding in which the film is placed in a mold and then the mold is filled with a resin by injection molding; and in-mold molding in which the film preformed is placed in a mold and then the mold is filled with a resin by injection molding.

A laminate including the resin film according to one or more embodiments can be used, for example, in the following products: paint substitutes such as interior and exterior materials for automobiles; civil engineering and building products such as window frames, bathroom furnishings, wall paper, floorings, daylighting or dimming members, sound-proof walls, and road signs; everyday sundries; furniture; housings of electrical appliances; housings of office automation equipment such as facsimile machines, laptop computers, and copying machines; optical members such as front panels of liquid crystal display screens of terminals including mobile phones, smartphones and tablet computers, lenses for lighting devices, headlights of automobiles, optical lenses, optical fibers, optical discs, and light guide plates for liquid crystal displays; optical elements; parts of electric or electronic devices; medical products requiring sterilization; toys or recreational goods; and fiber-reinforced resin composites.

In particular, since the resin film according to one or more embodiments is excellent in heat resistance and optical properties, the resin film is suitable as a film for optical purposes and can be used in various optical members. For example, the resin film can be used in known optical products, including: front panels of liquid crystal display screens of terminals such as mobile phones, smartphones, and tablet computers; lenses for lighting devices; headlights of automobiles; optical lenses; optical fibers; optical discs; liquid crystal display device-related products such as light guide plates, diffuser plates, back sheets, reflective sheets, polarizing film transparent resin sheets, retardation films, light-diffusing films, prism sheets, surface protective films, optically isotropic films, polarizer protective films, and transparent electrically-conductive films; organic EL device-related products; and products in the optical communication industry.

EXAMPLES

Hereinafter, one or more embodiments of the present invention will be specifically described using examples. One or more embodiments of the present invention are not limited to the examples presented below. In the following description, the word "part(s)" and the symbol "%" refer to "part(s) by weight" and "wt %", respectively, unless otherwise stated.

Example 1

<Production of Graft Copolymer (A1)>

An 8-L polymerization reactor equipped with a stirrer was charged with the following materials.

Deionized water 133 parts

Sodium hydroxide 0.004 parts

Di(2-ethylhexyl) sodium sulfosuccinate 0.2 parts

The interior of the polymerization reactor was thoroughly purged with nitrogen gas and then heated to 80° C., and 0.03 parts of sodium persulfate in the form of a 0.5% aqueous solution and 0.001 parts of sodium pyrosulfite in the form of a 0.5% aqueous solution were placed into the reactor. Subsequently, 40 parts of a monomer (a) for crosslinked (meth)acrylic polymer particle formation, which is shown in Table 1, was added continuously at a rate of 0.523 parts/min. The polymerization was continued for another 30 minutes to obtain crosslinked (meth)acrylic polymer particles (a). The polymerization conversion percentage was 99.5%. The average particle size is shown in Table 2.

After that, 60 parts of a monomer (b) for non-crosslinked methacrylic polymer component formation, which is shown in Table 1, was added continuously at a rate of 1.353 parts/min. The addition of 0.4 parts of di(2-ethylhexyl) sodium sulfosuccinate in the form of a 5% aqueous solution was started at the same time as the addition of the monomer (b), and the aqueous solution of di(2-ethylhexyl) sodium sulfosuccinate was added continuously over the same period of time as the monomer (b). After the addition of the monomer (b) and di(2-ethylhexyl) sodium sulfosuccinate, the polymerization was continued for 60 minutes to obtain a graft copolymer latex. The polymerization conversion percentage was 100.0%. The average particle size is shown in Table 2.

The latex obtained was dried at 75° C. for 12 hours to obtain a graft copolymer (A1) in the form of a white powder.

Examples 2 to 8 and Comparative Example 1

Graft copolymers (A2) to (A9) were produced in the same manner as the graft copolymer of Example 1, except that the types and amounts of the materials used were changed as shown in Table 1.

TABLE 1

|   |   | Example 1 | Example 2 | Example 3 | Example 4 | Example 5 | Example 6 | Example 7 | Example 8 | Comp. Example 1 |
|---|---|---|---|---|---|---|---|---|---|---|
|   | Graft copolymer | A1 | A2 | A3 | A4 | A5 | A6 | A7 | A8 | A9 |
| (a) | (a) Monomer (parts) | 40 | 30 | 30 | 15 | 15 | 10 | 7 | 5 | 15 |
|   | BA (%) | 100 | 100 | 100 | 100 | 100 | 100 | 100 | 100 | 100 |
|   | ALMA (% relative to monomer (a)) | 0.5 | 0.5 | 3 | 0.5 | 1 | 0.5 | 0.5 | 0.5 | 0.5 |
| (b) | (b) Monomer (parts) | 60 | 70 | 70 | 85 | 85 | 90 | 93 | 95 | 85 |
|   | MMA (%) | 90 | 94 | 94 | 90 | 90 | 94 | 94 | 94 | 91 |
|   | BMA (%) | 5 | 1 | 1 | 5 | 5 | 1 | 1 | 1 | 9 |
|   | PhMI (%) | 5 | 5 | 5 | 5 | 5 | 5 | 5 | 5 | 0 |
|   | 2-EHTG (parts per 100 parts of total monomers) | 0.03 | 0.048 | 0.06 | 0.03 | 0.03 | 0.0213 | 0.017 | 0.017 | 0.03 |

BA: Butyl acrylate
MMA: Methyl methacrylate
BMA: Butyl methacrylate
PhMI: Phenylmaleimide
ALMA: Allyl methacrylate
2-EHTG: 2-Ethylhexyl thioglycolate (Polymerization Conversion Percentage)

The polymerization conversion percentage of each of the polymers obtained by polymerization was determined in the following way. About 2 g of the latex containing the polymer was collected from the polymerization system and accurately weighed. The latex was dried in a hot air dryer at 120° C. for 1 hour, and the weight of the dried product was accurately measured as the solids weight. Next, the ratio between the weight measurement results obtained before and after the drying was determined as the solids ratio in the sample. Finally, the solids ratio was used to calculate the polymerization conversion percentage by the equation given below. In this equation, the polyfunctional monomer and the chain transfer agent are reckoned as part of the starting monomers.

Polymerization conversion percentage (%)={(total weight of starting raw materials×solids ratio−total weight of water and raw materials other than monomers)/weight of starting monomers}×100

(Weight-Average Molecular Weight of Non-Crosslinked Methacrylic Polymer Component (b))

For each of the graft copolymers obtained by polymerization, the weight-average molecular weight of the non-crosslinked methacrylic polymer component (b) was calculated by a standard polystyrene-equivalent method using gel permeation chromatography (GPC) and is shown in Table 2. The GPC column used was one packed with a crosslinked polystyrene gel (product name TSKgel Super HZM-H manufactured by Tosoh Corporation), and the GPC solvent used was tetrahydrofuran (THF). The sample solution used was a clear supernatant obtained by preparing a polymer solution composed of 20 mg of a powder of the graft copolymer and 10 ml of THF and centrifuging the polymer solution at 43,000 G for 30 minutes. The column temperature in GPC was set to 40° C.

(Average Particle Sizes of Crosslinked (Meth)Acrylic Polymer Particles (a) and Graft Copolymers (A1) to (A9))

The average particle sizes are volume mean diameters measured for the latexes obtained at the completion of the polymerization for producing the crosslinked (meth)acrylic polymer particles (a) and the graft copolymers (A1) to (A9). The measurement device used was Microtrac UPA150 manufactured by Nikkiso Co., Ltd., and the measured volume mean diameters are listed as the average particle sizes in Table 2. The measurement was performed at room temperature, and the refractive index of the particles of interest was assumed to be the weight average of the refractive indices of homopolymers formed from the monomers used for the polymerization. The refractive indices of the homopolymers were values presented in *Polymer Handbook* (J. Brandrup, Interscience, 1989).

Comparative Example 3

An 8-liter glass reactor equipped with a stirrer was charged with 200 parts of deionized water and 0.5 parts of disodium hydrogen phosphate as a suspension aid. Next, while the contents of the reactor were stirred at 300 rpm, a monomer liquid mixture composed of 91 parts of MMA containing 0.3 parts of dissolved lauroyl peroxide, 9 parts of BMA, and 0.018 parts of 2-ethylhexyl thioglycolate (2-EHTG) as a chain transfer agent was added to the reactor, and the interior of the reactor was heated to 60° C. under a nitrogen purge to initiate the polymerization. At 50 minutes after heating up to 60° C., 0.15 parts of ADEKA Pluronic F-68 (polyoxyethylene-polyoxypropylene block copolymer manufactured by ADEKA Corporation), which is a non-ionic water-soluble polymer, was added as a suspension stabilizer. The reaction was then allowed to proceed at 60° C. for another 200 minutes, after which the interior of the reactor was heated to 80° C. and the contents of the reactor were stirred for 3 hours to complete the polymerization. The resulting polymer was washed four times with deionized water the amount of which was three times greater than the resin amount, and the washed polymer was dried to obtain a suspension polymer (A10) in the form of beads (weight-average molecular weight=97×10$^4$).

(Weight-Average Molecular Weight of Suspension Polymer)

The weight-average molecular weight of the suspension polymer was calculated in the same manner as the weight-average molecular weight of the non-crosslinked methacrylic polymer component (b), except that a polymer solution composed of 20 mg of the beads of the suspension polymer and 10 ml of THF was used as a sample solution.

Comparative Example 4

An 8-L polymerization reactor equipped with a stirrer was charged with the following materials.
Deionized water 175 parts
Sodium polyoxyethylene lauryl ether phosphate 0.002 parts
Sodium carbonate 0.04725 parts The interior of the polymerization reactor was thoroughly purged with nitrogen gas and then heated to 80° C., and 0.03 parts of potassium persulfate in the form of a 2% aqueous solution was placed into the reactor. Subsequently, a mixture (I) (MMA25.2 parts, BA1.6 parts, St 0.2 parts, ALMA0.135 parts, n-OM 0.3 parts, sodium polyoxyethylene lauryl ether phosphate 0.1 parts) was added continuously over 81 minutes. The polymerization was continued for another 60 minutes to obtain a polymer of the mixture (I). The polymerization conversion percentage was 99.5%.

After that, 0.08 parts of potassium persulfate in the form of a 2% aqueous solution was added, and then a mixture (II) (BA41 parts, St 9 parts, ALMA0.75 parts, sodium polyoxyethylene lauryl ether phosphate 0.2 parts) was added continuously over 150 minutes. After the end of the addition of the mixture (II), 0.015 parts of potassium persulfate in the form of a 2% aqueous solution was added, and the polymerization was continued for 120 minutes to obtain a polymer of the mixture (II). The polymerization conversion percentage was 99.7%, and the average particle size was 220 nm.

After that, 0.023 parts of potassium persulfate in the form of a 2% aqueous solution was added, then a mixture (III) (MMA18.4 parts, BA4.6 parts) was added continuously over 70 minutes, and the polymerization was continued for 60 minutes to obtain a core-shell graft copolymer particle latex. The polymerization conversion percentage was 100.0%. The latex obtained was salted out and coagulated with magnesium chloride, and the resulting product was washed with water and dried to obtain a core-shell graft copolymer (A11) in the form of a white powder. The copolymer (A11) is a typical example of conventional core-shell graft copolymers.

(Average Particle Size of Intermediate Rubber Layer-Covered Cores of Graft Copolymer (A11))

The average particle size of the intermediate rubber layer-covered cores of the graft copolymer (A11) was calculated in the same manner as the average particle sizes of the graft copolymers (A1) to (A9), except that the measurement was conducted for the latex obtained by polymerization at the polymerization stage (II).

(Weight-Average Molecular Weight of Outermost Layers of Graft Copolymer (A11))

The weight-average molecular weight of the outermost layers of the graft copolymer (A11) was calculated in the same manner as the weight-average molecular weight of the non-crosslinked methacrylic polymer component (b), except that the graft copolymer (A11) was used.

(Preparation of Resin Dope)

Each of the graft copolymers (A1) to (A9) and the suspension polymer (A10) was individually used to prepare a resin dope having a solids concentration of 10%. Specifically, the resin dope was prepared by adding 4.5 g of the powder or beads of the polymer to 41.5 g of a solvent mixture of 92% methylene chloride and 8% ethanol and stirring the powder or beads in the solvent mixture with a magnetic stirrer until the powder or beads completely dissolved.

In Comparative Example 2, a resin dope containing the suspension polymer (A10) and the graft copolymer (A11) and having a solids concentration of 10% was prepared as follows: 0.68 g of the powder of the graft copolymer (A11) was added to 41.5 g of the above solvent mixture and stirred in the solvent mixture with a magnetic stirrer to homogeneity, and the resulting liquid dispersion was further subjected to a dispersing process in an ultrasonic bath (Bransonic 1510J manufactured by Yamato Scientific Co., Ltd.) for 15 minutes, after which 3.82 g of the beads of the suspension polymer (A10) were added bit by bit to the liquid dispersion, and stirred in the liquid dispersion until the beads completely dissolved.

(Making of Cast Film)

The resin dope prepared as above was cast onto a PET film (COSMOSHINE A4100 manufactured by Toyobo Co., Ltd.) and spread into a uniform layer by means of an applicator. The clearance of the applicator was adjusted so that the thickness of the layer would be 70 μm after drying. The layer was dried in a 40° C. drying atmosphere for 1 hour and then peeled from the PET film. The film thus obtained was fixed to a frame made of stainless steel and dried in a 140° C. drying atmosphere for 90 minutes to remove the residual solvent. In this manner, a cast film was obtained.

(Making of Uniaxially Stretched Film)

The cast film that had yet to be stretched was cut to prepare a test specimen in the shape of a 16 cm×16 cm square, and the test specimen was uniaxially stretched with the width fixed at 135° C. The stretching factor was 1.4 times, and the stretching speed was 150 mm/min (Film Thickness)

The thickness of the film was measured by means of a Digimatic indicator (manufactured by Mitutoyo Corporation).

(MIT)

The endurance to repeated folding of the uniaxially stretched film was measured using MIT-DA, an MIT tester manufactured by Toyo Seiki Seisaku-sho, Ltd. The film was cut to prepare a 1.5-cm-width test specimen, and the test specimen was subjected to a test in which a load of 200 g was applied to the test specimen at a bending radius of 0.4 mm and a bending angle of 135° in such a manner that the folding line was formed perpendicular to the stretching direction. The test was conducted three times, and the average of the three measured values is shown in Table 2.

(Trimming Test)

The uniaxially stretched film was cut quickly in a direction parallel to the stretching direction by means of a cutter (Quick Knife Q-100P manufactured by NT Incorporated) with a ruler pressed against the film. The appearance of the cut surface was rated on a 5-point scale according to the criteria listed below. The test was conducted five times per sheet of the uniaxially stretched film, and the average of the five scores is shown in Table 2. For the case where the average of the five scores is 3 or higher, the trimming resistance can be rated good.

1: The cut surface was not smooth over a length equal to or greater than half the entire length of the cut surface, and a crack or chipping with a size of 5 mm or more or film rupture occurred.
2: The cut surface was not smooth over a length equal to or greater than half the entire length of the cut surface, and a crack or chipping with a size of less than 5 mm occurred, but film rupture did not occur.
3: The cut surface was not smooth over a length equal to or greater than half the entire length of the cut surface, but any crack, chipping, or film rupture did not occur.

4: The surface was smooth over a length equal to or greater than half the entire length of the cut surface, and any crack, chipping, or film rupture did not occur.

5: The cut surface was smooth over its entire length.

(Haze)

The total haze of the unstretched film was measured using a haze meter (HZ-V3 manufactured by Suga Test Instruments Co., Ltd.) according to JIS K 7105. Additionally, both sides of the unstretched film were coated with glycerin, onto which glass sheets were placed to sandwich the unstretched film, and the resulting specimen was subjected to measurement identical to that of the total haze. The measured value was used as the internal haze of the unstretched film. The measurement results were converted to values for a film thickness of 50 μm, and such converted values are shown in Table 2.

(In-Plane Retardation and Out-of-Plane Retardation of Uniaxially Stretched Film)

A central portion of the stretched film was cut to prepare a test specimen. The in-plane retardation of the test specimen was measured using an automatic birefringence meter (KOBRA-WR manufactured by Oji Scientific Instruments Co., Ltd.) at a wavelength of 590 nm and an incident angle of 0°. Measurement at an incident angle of 40° was also conducted, and the out-of-plane retardation was calculated. Each of the in-plane retardation measurement and the measurement at an incident angle of 40° was conducted three times, and the measurement site of the test specimen was changed for each time of measurement by moving the test specimen. The average of the three measured values was converted to a value for a film thickness of 50 μm, and such converted values are shown in Table 2.

(Glass Transition Temperature)

The glass transition temperature of the crosslinked (meth)acrylic polymer particles (a) was calculated by the Fox equation using values presented in *Polymer Handbook* (J. Brandrup, Interscience, 1989).

The glass transition temperature of the non-crosslinked methacrylic polymer component (b) or the beads of the suspension polymer was measured using DSC 7000X, a differential scanning calorimeter manufactured by Hitachi High-Tech Science Corporation. The sample, which was the powder of the graft copolymer or the beads of the suspension polymer, was placed in a stream of nitrogen, heated to 190° C. at a temperature rise rate of 10° C./min and then held at 190° C. for 3 minutes, after which the sample was rapidly cooled to 40° C. and heated again to 190° C. at a temperature rise rate of 10° C./min. For the glass transition observed during the second heating, the average of the extrapolated glass transition onset temperature and the extrapolated glass transition end temperature was determined, and this average was used as the glass transition temperature. The results are shown in Table 2.

The glass transition temperature of the film was determined in the same manner as the glass transition temperature of the non-crosslinked methacrylic polymer component (b) or the beads of the suspension polymer, except that the cast film dried at 140° C. was further dried at 175° C. for 1 hour and then used as a sample for measurement. The results are shown in Table 2.

(Storage Stability of Graft Copolymer Powder)

The storage stability of the graft copolymer in the form of a powder was evaluated by a change over time in the particle size distribution as measured using a laser diffraction particle size distribution analyzer (Mastersizer 3000 manufactured by Malvern Panalytical). The dispersion medium used in the particle size distribution measurement was a solvent mixture of 92% methylene chloride and 8% ethanol. The measurement sample was a resin dope having a solids concentration of 10%, and this resin dope was prepared from the powder and the solvent mixture immediately before the measurement. In the measurement, the resin dope was added dropwise to the dispersion medium circulated in the analyzer, and the laser scattering intensity was controlled between 0.5 to 2.0%. The graft copolymer powder was stored at 50° C. and 95% RH, and the measurement was conducted for the powder at 0 day, 3 days, and 14 days after the start of the storage. The volume percentage of particles having a size of 1 μm or more in the total particle volume is shown in Table 2.

(Storage Stability of Resin Dope Containing Graft Copolymer)

The storage stability of a resin dope containing the graft copolymer was evaluated similarly to the storage stability of the graft copolymer powder. The solvent mixture used to prepare the resin dope was a solvent mixture of 82% methylene chloride and 18% methanol or a solvent mixture of 92% methylene chloride and 8% ethanol. The resin dope prepared at a solids concentration of 10% was stored at room temperature, and the measurement was conducted for the resin dope at 0 day, 3 days, and 14 days after the start of the storage. The dispersion medium used in the measurement was a solvent mixture having the same composition as that of the resin dope. The volume percentage of particles having a size of 1 μm or more in the total particle volume is shown in Table 2.

TABLE 2

| | | Example 1 | Example 2 | Example 3 | Example 4 | Example 5 | Example 6 | Example 7 |
|---|---|---|---|---|---|---|---|---|
| Graft copolymer or suspension polymer | | A1 | A2 | A3 | A4 | A5 | A6 | A7 |
| Average particle size (nm) | (a) | 97 | 94 | 97 | 77 | 74 | 61 | 61 |
| | (a) + (b) | 133 | 139 | 148 | 135 | 133 | 122 | 147 |
| Glass transition temperature of (a) (° C.) | | −54 | −54 | −54 | −54 | −54 | −54 | −54 |
| Weight-average molucular weight of (b) | ×1,000 | 485 | 387 | 322 | 500 | 510 | 693 | 750 |
| Glass transition temperature of (b) (° C.) | | 121 | 125 | 127 | 124 | 123 | 127 | 127 |
| (a)/((a) + (b)) (%) | | 40 | 30 | 30 | 15 | 15 | 10 | 7 |
| Endurance to repeated forlding (times) | | 96 × 10$^4$ | 17.3 × 10$^4$ | 456 | 5 × 10$^4$ | 4 × 10$^4$ | 6,486 | 5,109 |
| Trimming test | | 5 | 5 | 4 | 4 | 3 | 3 | 3 |
| Haze (%) | Total (50 μm) | 0.30 | 0.20 | 0.15 | 0.15 | 0.28 | 0.14 | 0.39 |
| | Internal (50 μm) | 0.10 | 0.05 | 0.03 | 0.07 | 0.10 | 0.11 | 0.13 |

TABLE 2-continued

|  |  |  |  |  |  |  |  |
|---|---|---|---|---|---|---|---|
| In-plane retardation (nm) | 10.6 | 10.7 | 10.0 | 10.1 | 10.5 | 10.5 | 11.0 |
| Out-of-plane retardation (nm) | −4.6 | −5.0 | −4.7 | −4.4 | −5.0 | −4.5 | −5.6 |
| Glass transition temperature of film (° C.) | 120 | 125 | 125 | 123 | 123 | 126 | 126 |
| Storage stability of powder ≥1 μm (%) 0th day | 0 | 0 | 0 | 0 | 0 | 0 | 0 |
| 3rd day | 0 | 0 | 0 | 0 | 0 | 0 | 0 |
| 14th day | 0 | 0 | 0 | 0 | 0 | 0 | 0 |
| Storage stability of dope ≥1 μm (%) 0th day | 0/0 | 0/0 | 0/0 | 0/0 | 0/0 | 0/0 | 0/0 |
| 3rd day | 0/0 | 0/0 | 0/0 | 0/0 | 0/0 | 0/0 | 0/0 |
| 14th day | 0/0 | 0/0 | 0/0 | 0/0 | 0/0 | 0/0 | 0/0 |

Left: DCM/MeOH
Right: DCM/EtOH

|  |  | Example 8 | Comp. Example 1 | Comp. Example 2 | Comp. Example 3 | Comp. Example 4 |
|---|---|---|---|---|---|---|
| Graft copolymer or suspension polymer |  | A8 | A9 | A10/A11 (85%/15%) | A10 | A11 |
| Average particle size (nm) | (a) | 52 | 79 | 220 | — | 220 |
|  | (a) + (b) | 141 | 149 | 240 | — | 240 |
| Glass transition temperature of (a) (° C.) |  | −54 | −54 | −4 | — | −4 |
| Weight-average molucular weight of (b) | ×1,000 | 773 | 227 | 60 | 100 | 60 |
| Glass transition temperature of (b) (° C.) |  | 127 | 103 | 116 | 117 |  |
| (a)/((a) + (b)) (%) |  | 5 | 15 | 77 | — | 77 |
| Endurance to repeated forlding (times) |  | 1,358 | 869 | 2,110 | 35 | Film formation was infeasible |
| Trimming test |  | 3 | 3 | 4 | 1 |  |
| Haze (%) | Total (50 μm) | 0.11 | 0.25 | 0.61 | 0.30 |  |
|  | Internal (50 μm) | 0.05 | 0.11 | 0.07 | 0.10 |  |
| In-plane retardation (nm) |  | 11.7 | 0.1 | 8.6 | 0.1 |  |
| Out-of-plane retardation (nm) |  | −5.6 | −3.7 | −10.6 | −3.7 |  |
| Glass transition temperature of film (° C.) |  | 127 | 103 | 116 | 117 |  |
| Storage stability of powder ≥1 μm (%) | 0th day | 0 | 0 | 1.6 | — |  |
|  | 3rd day | 0 | 0 | 100 | — |  |
|  | 14th day | 0 | 0 | 100 | — |  |
| Storage stability of dope ≥1 μm (%) | 0th day | 0/0 | 0/0 | 1.6/10.0 | — |  |
|  | 3rd day | 0/0 | 0/0 | 1.6/63.3 | — |  |
|  | 14th day | 0/0 | 0/0 | 1.6/79.9 | — |  |

Left: DCM/MeOH
Right: DCM/EtOH

DCM: Methylene chloride,
MeOH: Methanol,
EtOH: Ethanol

Table 2 reveals the following findings. In each of Examples 1 to 8, a resin film having high folding resistance, trimming resistance, and heat resistance and having low haze was successfully formed from the graft copolymer alone. Additionally, the graft copolymer powder and the graft copolymer-containing dope exhibited high storage stability.

In Comparative Example 1 using a graft copolymer for which the weight-average molecular weight of the non-crosslinked methacrylic polymer component was set as low as less than 25×10⁴, the resin film produced had a low glass transition temperature and had low heat resistance. In Comparative Example 2 where a resin film was made using a methacrylic resin incorporating a core-shell graft copolymer as is conventionally done, the resin film had high haze, and both the core-shell graft copolymer powder and the core-shell graft copolymer-containing dope had low storage stability as demonstrated by an increase over time in the amount of coarse particles. The resin film of Comparative Example 3, which was made from a common methacrylic resin alone, was unsatisfactory in terms of folding resistance and trimming resistance. As proved by Comparative Example 4, a resin film was not able to be made from a conventional core-shell graft copolymer alone.

For the graft copolymers obtained in Examples 4 and 6 to 8, the elastic modulus and the moisture permeability were measured according to the methods described below. The results are shown in Table 3.

(Elastic Modulus)

Each of the resin films subjected to the measurement was made by the following procedures. First, 2 g of the corresponding graft copolymer was added to and dissolved in 18 g of a solvent mixture of 92% methylene chloride and 8% ethanol to prepare a dope having a solids concentration of 10%. The dope was applied to a wet thickness of 0.6 mm on a PET film (product name: COSMOSHINE A4100 manufactured by Toyobo Co., Ltd.), and immediately a tray was placed upside down over the applied dope, which was dried at room temperature for 30 minutes and then dried in a hot air dryer at 40° C. for 60 minutes. Thus, a semi-dry film was made. The semi-dry film was peeled from the PET film, then fixed to a metal frame, and dried in a hot air dryer at 140° C. for 1 hour to make a 40-μm-thick film.

The film thus obtained was cut into a strip with a width of 10 mm and a length of 130 mm, and the strip was subjected to tensile testing at a chuck-to-chuck distance of 100 mm and a tensile speed of 13 mm/min. The elastic modulus was calculated in the range of 3 to 12 mm. The number of tests n was 7, and the average of seven values was determined as the calculation result.

(Moisture Permeability)

Each of the resin films subjected to the measurement was made by the following procedures. First, 2 g of the corresponding graft copolymer was added to and dissolved in 18 g of a solvent mixture of 82% methylene chloride and 18% methanol to prepare a dope having a solids concentration of 10%. The dope was applied to a wet thickness of 0.5 mm on a PET film (product name: COSMOSHINE A4100 manufactured by Toyobo Co., Ltd.) and immediately dried in a hot air dryer at 40° C. for 10 minutes to make a semi-dry film. The semi-dry film was peeled from the PET film, then fixed to a metal frame having a suitable size, and further dried in a hot air dryer at 140° C. for 1 hour to make a 50-μm-thick film.

The moisture permeability of the film was measured by a dish method according to JIS Z 0208-1976. A sample was prepared using the 50-μm-thick circular film, a dish having a measurement area of 28.3 cm$^2$ (manufactured by Tester Sangyo Co., Ltd.), and 8 g of calcium chloride for moisture content measurement (Wako) and placed into a thermo-hygrostat (model: LH33-13P, manufactured by Nagano Science Co., Ltd.), in which the measurement was conducted at 40° C. and 90% RH.

TABLE 3

|     |                                          | Example 4       | Example 6 | Example 7 | Example 8 |
| --- | ---------------------------------------- | --------------- | --------- | --------- | --------- |
|     | Graft copolymer                          | A4              | A6        | A7        | A8        |
| (a) | (a) Monomer (parts)                      | 15              | 10        | 7         | 5         |
|     | BA (%)                                   | 100             | 100       | 100       | 100       |
|     | ALMA (% relative to monomer (a))         | 0.5             | 0.5       | 0.5       | 0.5       |
| (b) | (b) Monomer (parts)                      | 85              | 90        | 93        | 95        |
|     | MMA (%)                                  | 90              | 94        | 94        | 94        |
|     | BMA (%)                                  | 5               | 1         | 1         | 1         |
|     | PhMI (%)                                 | 5               | 5         | 5         | 5         |
|     | 2-EHTG                                   | 0.03            | 0.0213    | 0.017     | 0.017     |
|     | (parts per 100 parts of total monomers)  |                 |           |           |           |
|     | Endurance to repeated folding (times)    | $5 \times 10^4$ | 6,486     | 5,109     | 1,358     |
|     | Trimming test                            | 4               | 3         | 3         | 3         |
|     | Moisture permeability (g/m$^2$/day)      | 64.5            | 52.1      | 49.6      | 47.1      |
|     | Elastic modulas (MPa)                    | 2,094           | 2,464     | 2,496     | 2,528     |

BA: Butyl acrylate
MMA: Methyl methacrylate
BMA: Butyl methacrylate
PhMI: Phenylmaleimide
ALMA: Allyl methacrylate
2-EHTG: 2-Ethylhexyl thioglycolate Table 3 reveals the following findings. In each of Examples 4 and 6 to 8, a resin film superior not only in the folding resistance and trimming resistance described above but also in the moisture permeability and elastic modulus was successfully formed from the graft copolymer alone. In particular, the resin films obtained in Example 6 and 7 had a good balance between the moisture permeability and elastic modulus.

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

The invention claimed is:

1. A graft copolymer comprising:
   crosslinked (meth)acrylic polymer particles (a) having an average particle size of 150 nm or less and a glass transition temperature of −10° C. or lower; and
   a non-crosslinked methacrylic polymer component (b) having a weight-average molecular weight of 30×10$^4$ or more and a glass transition temperature of 118° C. or higher, wherein
   at least a part of the non-crosslinked methacrylic polymer component (b) is grafted to the crosslinked (meth)acrylic polymer particles (a), and
   the crosslinked (meth)acrylic polymer particles (a) account for 1 to less than 50 wt % of a total weight of the crosslinked (meth)acrylic polymer particles (a) and the non-crosslinked methacrylic polymer component (b).

2. The graft copolymer according to claim 1, wherein the non-crosslinked methacrylic polymer component (b) comprises 70 to 99 wt % of methyl methacrylate units.

3. The graft copolymer according to claim 2, wherein the non-crosslinked methacrylic polymer component (b) further comprises at least one type of monomer units selected from the group consisting of N-substituted maleimide monomer units, methacrylic ester units having an ester moiety that is a primary or secondary hydrocarbon group having 2 to 20 carbon atoms or that is an aromatic hydrocarbon group, methacrylic ester units having an ester moiety that is a saturated hydrocarbon group having a fused ring structure and having 7 to 16 carbon atoms, methacrylic ester units having an ester moiety that is a linear or branched group containing an ether bond, and styrenic monomer units.

4. The graft copolymer according to claim 2, wherein the non-crosslinked methacrylic polymer component (b) further comprises at least one type of monomer units selected from the group consisting of N-substituted maleimide monomer units and methacrylic ester units having an ester moiety that is a saturated hydrocarbon group having a fused ring structure and having 7 to 16 carbon atoms.

5. The graft copolymer according to claim 1, wherein the crosslinked (meth)acrylic polymer particles (a) comprise a monomer component other than a polyfunctional monomer, and the monomer component comprises 90 to 100 wt % of an alkyl acrylate having an alkyl group having 1 to 8 carbon atoms.

6. The graft copolymer according to claim 1, wherein the crosslinked (meth)acrylic polymer particles (a) are formed from 100 parts by weight of a monomer component other than a polyfunctional monomer and 0.1 to 2.0 parts by weight of the polyfunctional monomer.

7. A resin composition for use in film production by solution casting, the resin composition comprising the graft copolymer according to claim 1.

8. A dope comprising the resin composition according to claim 7 and a solvent.

9. A resin film production method comprising casting the dope according to claim 8 onto a surface of a support and subsequently evaporating the solvent.

10. A resin film formed from the resin composition according to claim 7 by solution casting.

11. The resin film according to claim 10, wherein the resin film has a thickness of 1 to 500 μm.

12. The resin film according to claim 10, wherein the resin film is a protective film disposed on a surface of a base material.

13. The resin film according to claim 10, wherein the resin film is an optical film.

14. The resin film according to claim 13, wherein the optical film is a polarizer protective film.

15. A polarizing plate comprising a polarizer and the resin film according to claim 14, wherein the resin film is disposed on the polarizer.

16. A display device comprising the polarizing plate according to claim 15.

17. The resin composition according to claim 7, wherein a content of another resin which is different from the graft copolymer is from 0 to 30 parts by weight per 100 parts by weight of the graft copolymer.

18. The resin film according to claim 10, wherein a haze of the resin film as measured when the thickness of the resin film is 50 μm is 0.4% or less.

19. The graft copolymer of claim 1, wherein the crosslinked (meth)acrylic polymer particles (a) account for 1 to less than 35 wt % of the total weight of the crosslinked (meth)acrylic polymer particles (a) and the non-crosslinked methacrylic polymer component (b).

20. A graft copolymer comprising:
crosslinked (meth)acrylic polymer particles (a) having an average particle size of 150 nm or less and a glass transition temperature of −10° C. or lower; and
a non-crosslinked methacrylic polymer component (b) having a weight-average molecular weight of $25\times10^4$ or more,
wherein
at least a part of the non-crosslinked methacrylic polymer component (b) is grafted to the crosslinked (meth)acrylic polymer particles (a), and
the crosslinked (meth)acrylic polymer particles (a) account for 1 to less than 35 wt % of a total weight of the crosslinked (meth)acrylic polymer particles (a) and the non-crosslinked methacrylic polymer component (b).

* * * * *